United States Patent [19]

Ishii et al.

[11] Patent Number: 5,295,002
[45] Date of Patent: Mar. 15, 1994

[54] IMAGE COMMUNICATION DEVICE

[75] Inventors: Yuji Ishii; Toshihiro Kumano, both of Chiisagata; Shiro Takamizawa, Saku; Hiroyuki Yamada; Masanori Sato, both of Chiisagata, all of Japan

[73] Assignee: Matsushita Graphic Communication Systems, Inc., Tokyo, Japan

[21] Appl. No.: 899,038

[22] Filed: Jun. 16, 1992

Related U.S. Application Data

[63] Continuation of Ser. No. 626,289, Dec. 12, 1990, abandoned.

[30] Foreign Application Priority Data

Dec. 18, 1989 [JP] Japan .................................. 1-327917

[51] Int. Cl.⁵ .............................................. H04N 1/04
[52] U.S. Cl. .................................... 358/498; 358/400; 361/214
[58] Field of Search ............... 358/400, 401, 474, 491, 358/494, 496, 498; 361/214; 355/219, 308

[56] References Cited

U.S. PATENT DOCUMENTS

| | | | |
|---|---|---|---|
| 4,630,123 | 12/1986 | Kadomatsu | 358/498 |
| 4,729,036 | 3/1988 | Ikeda et al. | 358/498 |
| 4,750,046 | 6/1988 | Chu | 358/498 |
| 4,750,047 | 6/1988 | Kotani et al. | 358/476 |
| 4,835,619 | 5/1989 | Kobori et al. | 358/498 |
| 5,010,441 | 4/1991 | Fox et al. | 361/214 |

Primary Examiner—Edward L. Coles, Sr.
Assistant Examiner—Thomas D. Lee
Attorney, Agent, or Firm—Wenderoth Lind & Ponack

[57] ABSTRACT

An image communication device having a lower and an upper chassis, the lower chassis having a plurality of rollers for transporting original documents and a guide plate for guiding them, the upper chassis being located above the lower chassis and having a plurality of rollers for transporting recording paper. The lower chassis has a pair of side plates whose top edges contain a plurality of open-ended recesses. Inside the recesses are bearings that rotatably support the document transporting rollers. The guide plate has projections that press the bearings against the recess bottoms. Attaching the guide plate to the lower chassis causes the projections of the former to fix the bearings concurrently. The bearings and guide plate are preferably made up of conductive materials. The rollers are connected to ground via the bearings and guide plate.

9 Claims, 7 Drawing Sheets

IMAGE COMMUNICATION DEVICE

This application is a Rule 1.62 continuation of now abandoned application, Ser. No. 07/626,289, filed Dec. 12, 1990.

BACKGROUND OF THE INVENTION

1. Field of the Invention

The present invention relates to an image communication device.

2. Description of the Prior Art

Prior art image communication devices generally comprise a plurality of rollers for transporting and ejecting original documents to be read for transmission, a plurality of rollers for transporting and ejecting recording paper on which to record data, and latches by which to keep the device cover closed. The roller and latch shafts are secured by a chassis with side plates on both sides thereof. The side plates have a plurality of through holes through which to pass the bearings supporting the roller and latch shafts. For assembly, the shafts are first inserted into the through holes. The shafts and the through holes are then equipped with the bearings from outside the side plates. This positions each shaft on the chassis. Gears, latches and other related parts are inserted onto the shafts and are ultimately fixed thereto with E rings and screws. Generally the chassis is made of a metal.

One disadvantage of the above-described prior art construction is that the assembling of the roller and latch shafts tends to become complicated and requires increasing numbers of steps.

Plastic resin chassis have recently been developed and utilized for cost reduction purposes. One disadvantage of using the plastic resin chassis is that the roller shafts are not electrically connected to ground therethrough. The static electricity trapped in the rollers sometimes results in such troubles as jammed and otherwise feed-disrupted documents.

BRIEF SUMMARY OF THE INVENTION

It is therefore an object of the present invention to provide an image communication device which is easy to assemble in a small number of steps.

It is another object of the present invention to provide an image communication device whose chassis has side plates to which a plurality of rollers are easily attached.

It is a further object of the present invention to provide an image communication device which, despite its use of nonconductive chassis material, allows the rollers to be connected to ground in a simple manner.

It is an even further object of the present invention to provide an image communication device whose latch shaft is easily attached to the chassis.

According to one aspect of the invention, there is provided an image communication device having a lower chassis and an upper chassis, the lower chassis supporting a plurality of rollers for transporting original documents, the upper chassis being located above the lower chassis and supporting a plurality of rollers for transporting sheets of recording paper. This construction permits easy assembly: attaching the recording paper transporting rollers to the upper chassis makes up a unit which is then readily mounted as a whole on the lower chassis.

According to another aspect of the invention, there is provided an image communication device having a chassis equipped with a pair of side plates for supporting a plurality of rollers, the top edges of the side plates having open-ended recesses for accomodating bearings attached to the rollers. This construction also permits easy assembly: with the bearings and gears built in the rollers, simply inserting the bearings into the recesses allows the rollers to be mounted on the chassis.

In a preferred embodiment, a guide plate for guiding original documents is fixedly mounted on the chassis. The guide plate has projections that press the bearings in the recesses against the bottom thereof. Thus simply securing the guide plate to the chassis fixes the bearings that support the rollers.

Where the chassis is made of a nonconductive material such as a plastic resin, it is preferred to connect the rollers to ground by use of conductive bearings and a conductive guide plate that is connected to ground.

According to a further aspect of the invention, there is provided an image communication device of a novel construction for attaching the latch shaft and other related parts to a chassis equipped with a pair of side plates. The construction comprises a plurality of recesses and a plurality of positioning projections. The recesses have one end thereof opened onto the two side plates and comprise, at their bottom, curved portions for accommodating the shafts. The projections engage with the shafts held by the recesses so that the shafts are securely positioned in the curved portions. Simply pushing the shafts into the curved portions at the bottom of the recesses causes the positioning projections to secure the shafts inside the curved portions with no screws. In this manner, the shafts are mounted easily.

The above and other related objects and features of the invention, as well as the novelty thereof, will clearly appear from the following description and from the accompanying drawings.

DETAILED DESCRIPTION OF PREFERRED EMBODIMENTS

Figure 1:
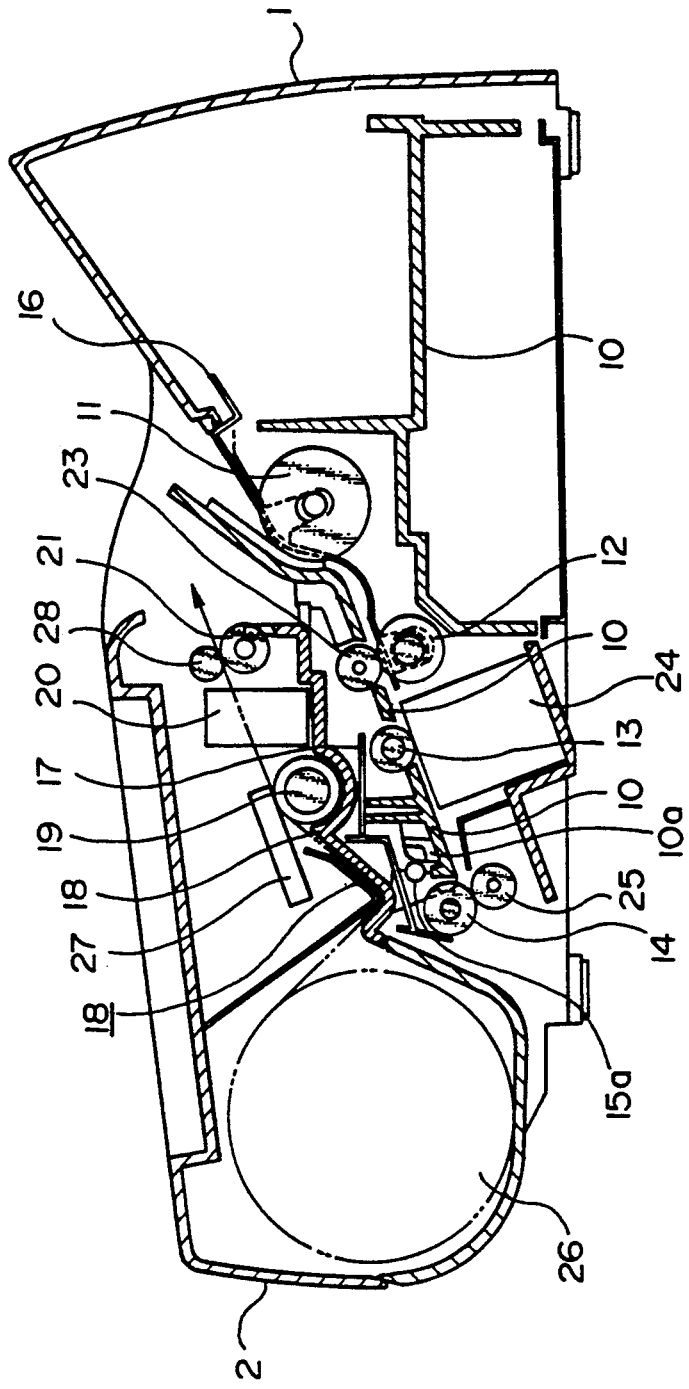
FIG. 1 is a schematic sectional view of an image communication device according to a preferred embodiment of the present invention.
Figure 2:
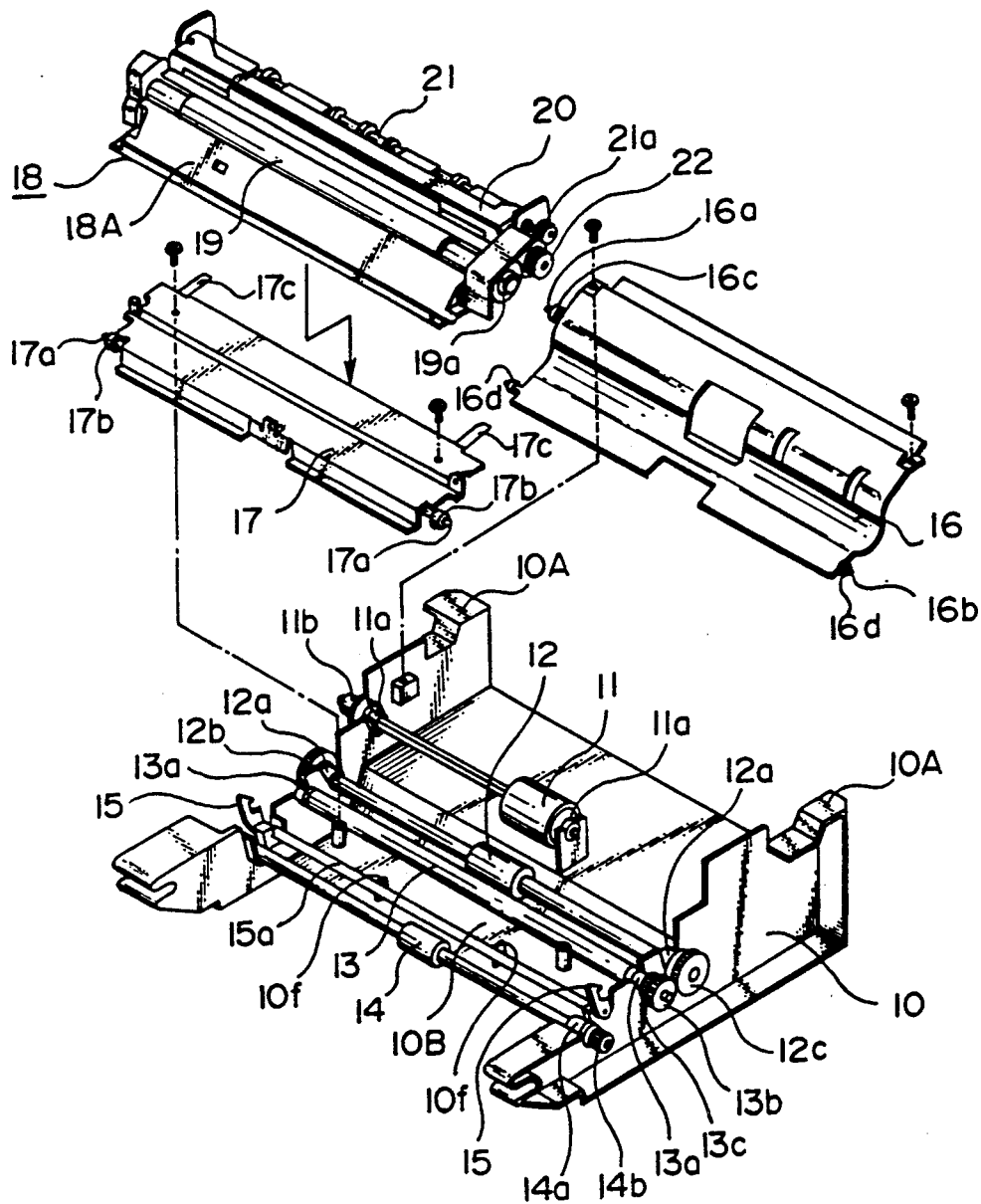
FIG. 2 is a fragmentary exploded view showing key parts of the embodiment.

Referring to FIGS. 1 and 2, the image communication device according to the present invention comprises a housing 1, a cover 2 movably mounted on the housing 1 and a base (i.e., lower) chassis 10 accommodated inside the housing 1. The base chassis 10 has side plates 10A on both sides thereof and a bottom plate 10B that connects the side plates 10A. The base chassis 10 may be made of a metal but should preferably be of a plastic resin. A plastic resin base chassis 10 has an advantage of being produced at low cost. The base chassis 10 has an introducing roller 11, a feed roller 12, a reading roller 13 and an ejection roller 14 rotatably mounted on conductive bearings 11a, 12a, 13a and 14a, respectively. The introducing roller 11 introduces original documents into the device; the feed roller 12 forwards the introduced original; the reading roller 13 positions the original to a reading point inside; and the ejection roller 14 ejects the original out of the device. The bearings 11a through 14a are usually made of a metal but may be constituted by a conductive plastic resin or the like. The introducing roller 11 is equipped with an introducing roller gear 11b that transmits the torque of a driving motor, not shown, to the introducing roller. The feed roller 12 is equipped with a feed roller gear 12b and a driving power transmission gear 12c for transmitting the torque of a driving motor, not shown, to the feed roller. To the reading roller 13 are attached a reading roller gear 13b and a driving power transmission pulley 13c, both engaged with the driving power transmission gear 12c. A pulley 14b is attached to the ejection roller 14. A belt, not shown, is held taut between pulleys 13c and 14b so that the revolutions of the pulley 13c are transmitted to the pulley 14b. The rollers 11 through 14 constitute a document transport means in the transmitting section of the device. The base chassis 10 further comprises a latch shaft 15a, both ends of which have latches 15 for keeping the cover 2 on top of the device closed.

Figure 3:
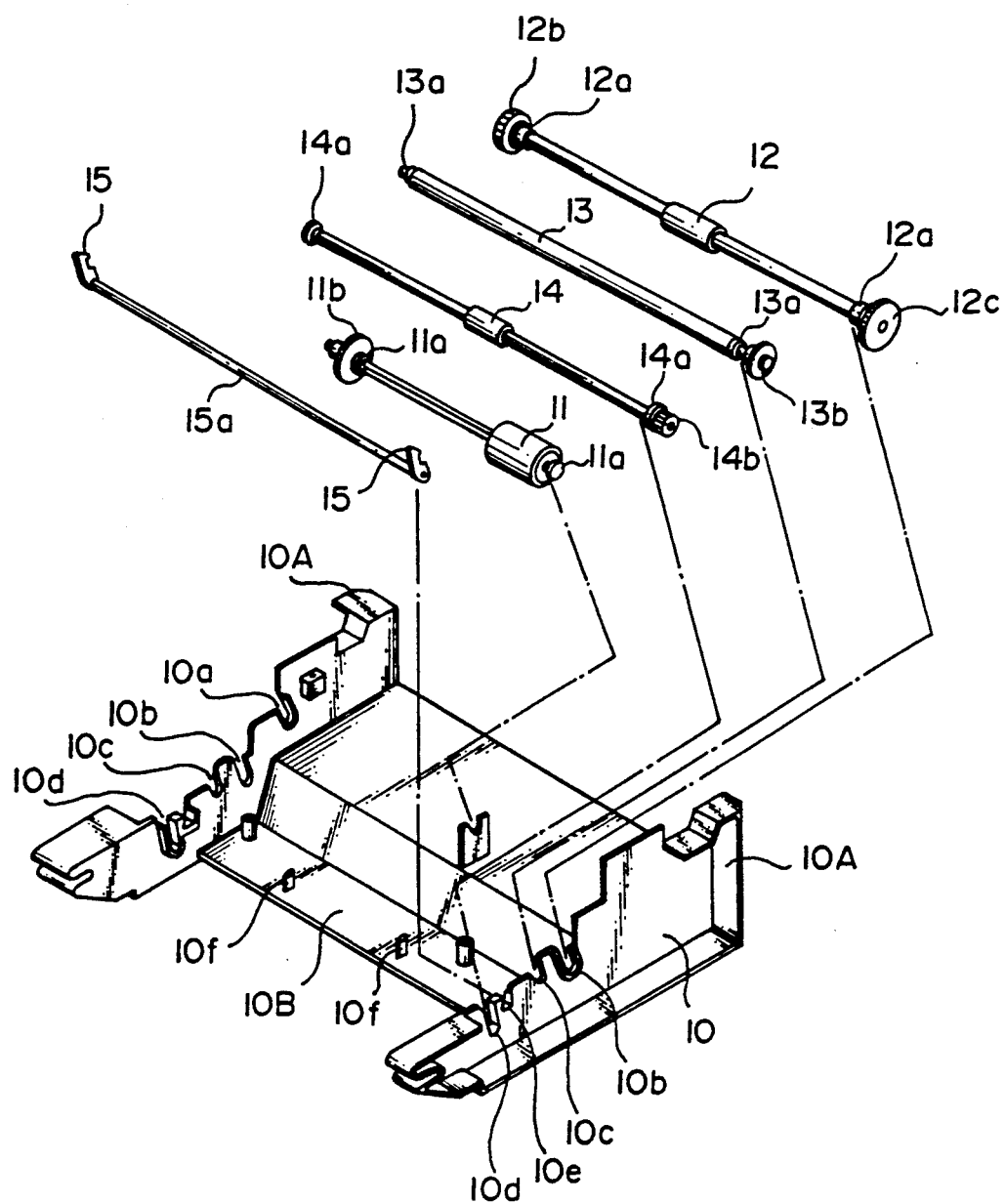
FIG. 3 is an exploded view of a base chassis and rollers attached thereto in the embodiment.

Referring to FIG. 3, the side plates 10A of the base chassis 10 have recesses 10a, 10b, 10c and 10d. Each of these recesses is open at its top on the side plates 10A. Thus with the bearings and gears attached to the rollers, simply inserting the bearings from the top openings of these recesses seats the bearings at the recess bottom and sets the rollers in place. This significantly facilitates the assembling of the rollers on the device.

Figure 4:
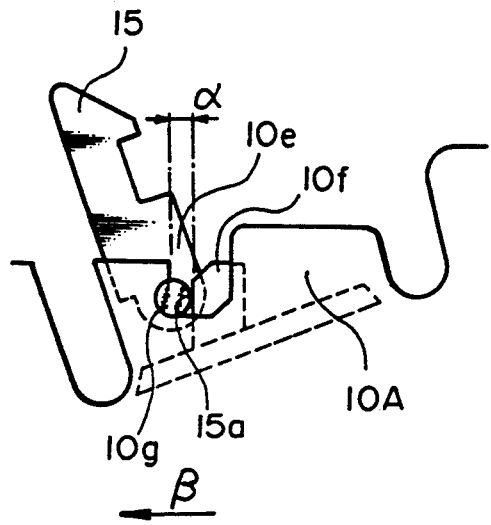
FIG. 4 is a schematic side view showing how a latch is mounted in the embodiment.

The side plates 10A of the base chassis 10 further comprise recesses 10e which are open at their top and which accommodate the latch shaft 15a. The bottom plate 10B has positioning projections 10f at points such that they come into contact with the latch shaft 15a supported by the recesses 10e. FIG. 4 illustrates how thw recess 10e and positioning projections 10f are seen in the axial direction of the latch shaft 15a. As indicated, a gap α formed between the positioning projections 10f and the sidewalls of recesses 10e opposed thereto is designed to be smaller than the diameter of the latch shaft 15a. In addition, those bottoms of the sidewalls of recesses 10e which are opposite to the positioning projections 10f have curved portions 10g that match the circumference of the latch shaft 15a. With this construction, placing the latch shaft 15a onto the recesses 10e and pressing them downward forces the shaft 15a into the recesses 10e and positions them in the curved portions 10g as the middle section of the shaft 15a bends in the direction of arrow β. The latch shaft 15a is fixedly mounted on the base chassis 10 with no use of screws or other fittings. In this manner, the ease of mounting the latch shaft 15a is promoted appreciably.

Referring again to FIGS. 1 and 2, a guide plate 16 made of metal is screwed or otherwise attached to the base chassis 10, the plate guiding original documents from upstream to downstream of the introducing roller 11. On both sides of the guide plate 16 are projections 16a and 16b equipped respectively with conductive elastic members 16c and 16d, illustratively made of a conductive rubber. The projections 16a and 16b together with the conductive elastic members 16c and 16d are positioned so that when the guide plate 16 is mounted on the appropriate position of the base chassis 10, the projections and their elastic members contact and secure the bearings 11a and 12a on the chassis 10. The conductive elastic members 16c and 16d are provided so as to absorb any dispersion in machined size or distortion of the guide plate 16. This allows the projections 16a and 16b to contact firmly and secure the bearings 11a and 12a while making the guide plate 16 conductive at the same time. If the guide plate 16 is machined with more precision, or if the guide plate 16 is capable of absorbing dimensional change or deformation on its own, the conductive elastic members may be omitted and the projections 16a and 16b may be allowed to contact the bearings 11a and 12a directly.

Figure 5:
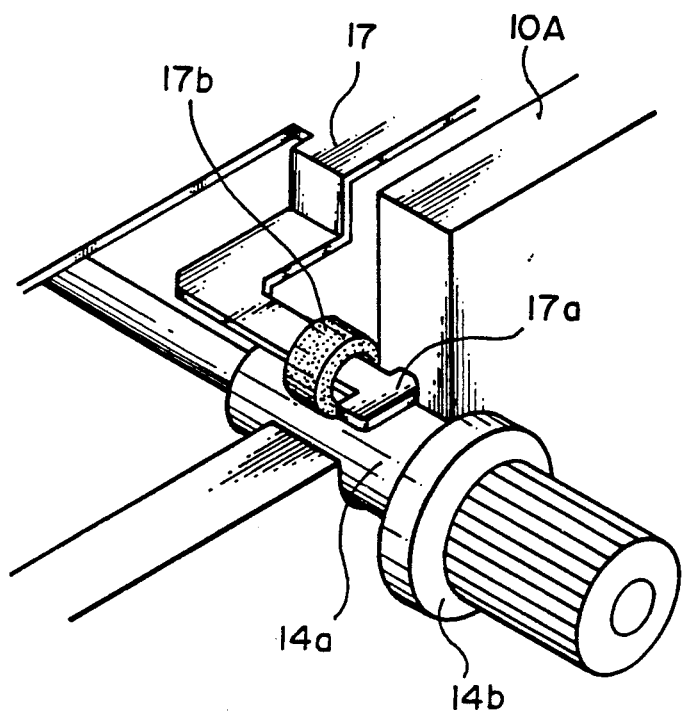
FIG. 5 is a schematic side view depicting how a roller bearing is mounted in the embodiment.

A stay 17 made of metal is further attached to the base chassis 10. As with the guide plate 16, the stay 17 has on both sides thereof projections 17a equipped with conductive elastic members 17b. As shown in FIG. 5, when the stay 17 is mounted on the base chassis 10, the elastic members 17b contact and secure the bearings 14a. Plate springs 17c are attached to notches of the stay 17 and, during assembling, come into contact with and secure the bearings 13a.

The guide plate 16 and the stay 17 are in contact with and grounded to plate springs, not shown, which in turn are connected to ground.

Figure 6:
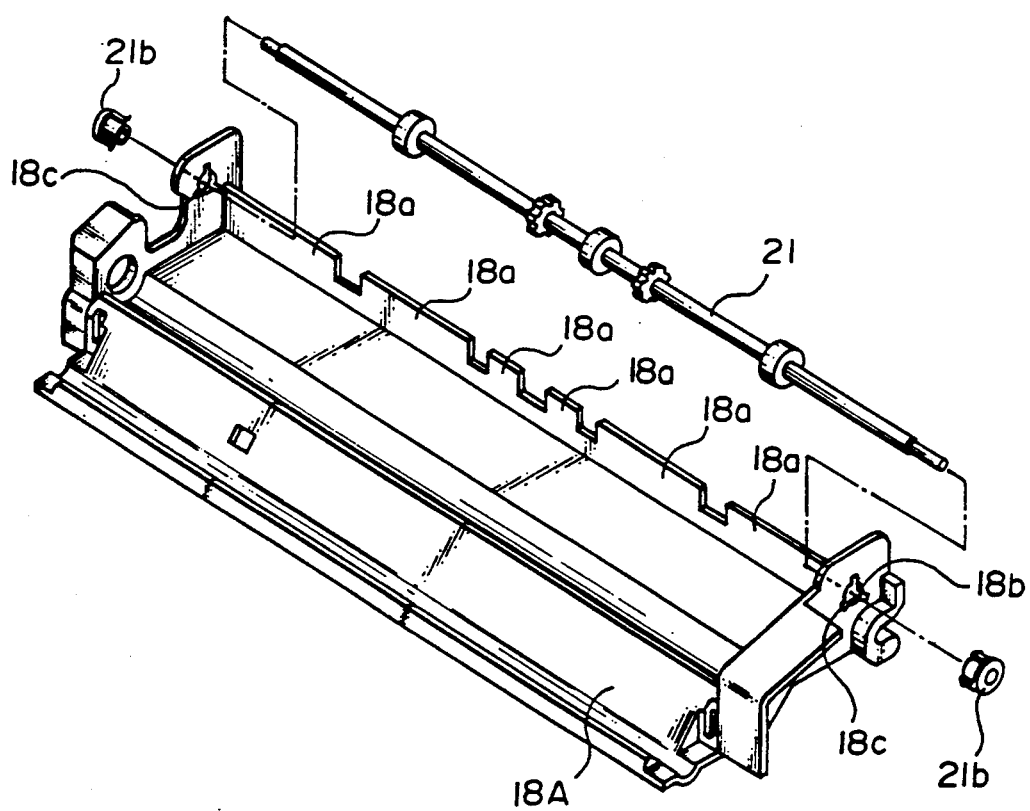
FIG. 6 is an exploded view of a receiving chassis and an ejection roller in the embodiment.
Figure 7:
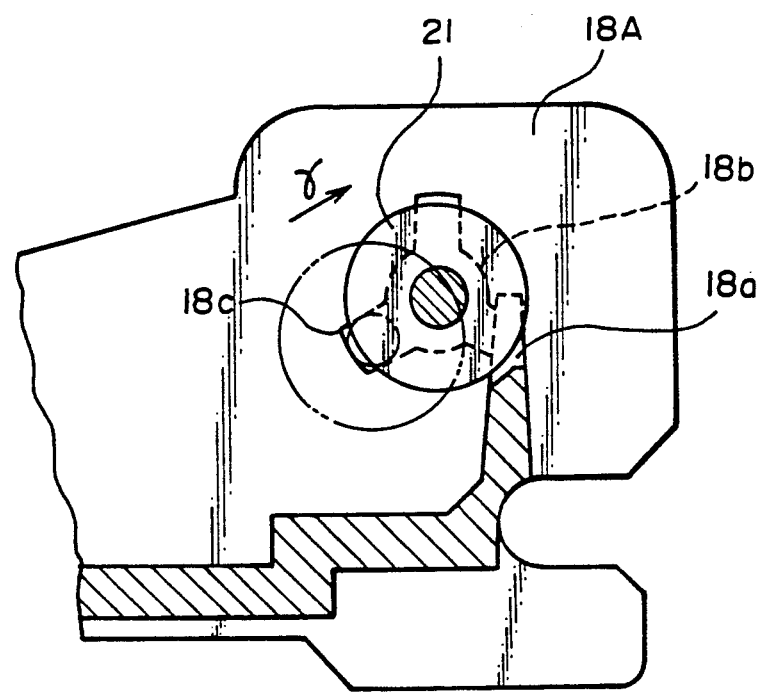
FIG. 7 is a schematic sectional view of how the ejection roller is mounted in the embodiment.

On the top of the base chassis 10 is mounted a receiving block 18 that constitutes part of the receiving section of the device. The receiving block 18 comprises a receiving (i.e., upper) chassis 18A. The receiving chassis 18A in turn contains a platen roller 19 for transporting recording paper, a platen roller gear 19a for driving the platen roller 19, a cutter 20 for cutting the recording paper, an ejection roller 21 for ejecting the recording paper, an ejection roller gear 21a for driving the ejection roller 21, and an idler gear 22 for connecting the platen roller gear 19a to the ejection roller gear 21a. The receiving chassis 18A is shaped as depicted in FIG. 6. Close to the position where the ejection roller 21 is mounted exist ribs 18a. The side plates on both sides have holes 18b through which to insert the ejection roller 21. To mount the ejection roller 21 on the receiving chassis 18A, both ends of the roller are inserted into the holes 18b one side at a time from within, and then the bearings 21b are placed on the roller and secured from the outside. In a putative assembling situation, inserting the ejection roller 21 into the center of each hole 18b would cause interference with the ribs 18a of the receiving chassis 18A. Such interference is circumvented by this embodiment having notches 18c made in the holes 18b of the side plates. Upon assembly, both ends of the ejection roller 21 are inserted into the notches 18c one side at a time. After this, the ejection roller 21 is moved in the direction of arrow γ to the center of the holes 18b. Then the bearings 21b are inserted and secured from the outside. This allows the ejection roller 21 to be mounted with no interference with the ribs 18a. The ribs 18a are designed to prevent the recording paper with received data recorded thereon from getting rewound into the device by the ejection roller 21.

Figure 8:
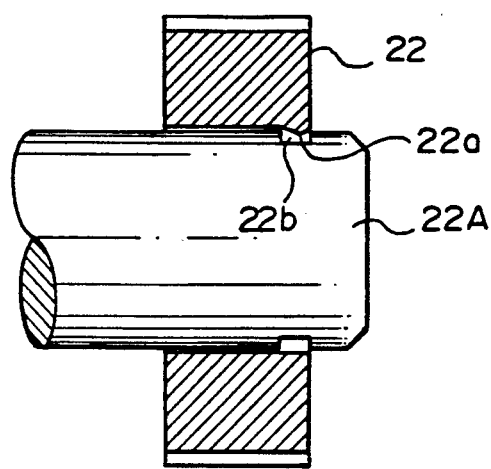
FIG. 8 is a schematic sectional view of how an idler gear is mounted in the embodiment.
Figure 9:
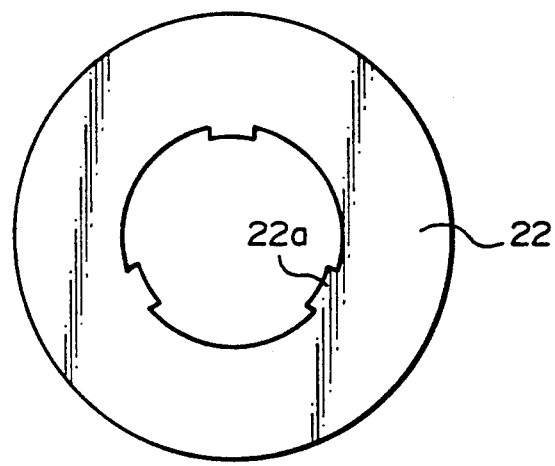
FIG. 9 is a side view of the idler gear.

FIGS. 8 and 9 show how the idler gear 22 is illustratively mounted. Rotatably attached to a shaft 22A, the idler gear 22 has a plurality of inside projections 22a.

The shaft 22A has a circular groove 22b on its circumference. The minimum inner diameter of the projections 22a is smaller than the outer diameter of the shaft 22A. With this construction, forcing the idler gear 22 onto the shaft 22A puts the projections 22a into the circular groove 22b. The idler gear 22 is restricted in terms of thrust by the projections 22a while freely rotating around the shaft 22A. This makes it very easy to assemble the idler gear 22. Alternatively, the idler gear 22 may be rotatably attached to the shaft 22A by use of a conventional E ring for thrust restriction.

Referring to FIG. 1, a freely rotating pinch roller 23 is located above and pressed against the feed roller 12. Under the reading roller 13 is a contact-type image sensor unit 24 that reads original documents being fed. Another freely rotating pinch roller 25 is located below and pressed against the ejection roller 14.

The front end of the device has a section that accommodates a roll of recording paper 26. Above the platen roller 19 is a thermal head 27 that prints data on the recording paper in conjunction with the platen roller 19. Another freely rotating pinch roller 28 is located above the ejection roller 21.

Below is a description of how the above-described embodiment operates. Before the operation, as shown in FIG. 3, the bearings 11a, 12a, 13a and 14a are mounted on the introducing roller 11, feed roller 12, reading roller 13 and ejection roller 14, respectively. After the gears 11b, 12b, 12c, 13b as well as the pulleys 13c and 14b are mounted on the rollers for the assembly thereof, the bearings are inserted through the top openings of the recesses 10a, 10b, 10c and 10d formed in the side plates 10A of the base chassis 10. The bearings are thus seated on the bottom of each recess. As depicted in FIG. 4, the latch shaft 15a is placed in the recesses 10e and pressed downward for entry thereinto. With its center deflected, the latch shaft 15a is secured in the curved portions 10g at the bottom.

The guide plate 16 and the stay 17 are then screwed to the base chassis 10. This causes the conductive elastic members 16c, 16d and 17d mounted on the projections of the guide plate 16 and stay 17 to contact and secure the bearings 11a, 12a and 14a (see FIG. 5). The plate springs 17c of the stay 17 come into contact with and secure the bearings 13a. That is, simply attaching the guide plate 16 and the stay 17 secures the bearings in their respective positions. Since the members 16c, 16d and 17d as well as the plate springs 17c mounted on the guide plate 16 and stay 17 are elastic, these parts firmly fix the bearings by absorbing any dimensional irregularities that may have occurred to the guide plate 16 or stay 17 during machining or assembling. Attaching the guide plate 16 and stay 17 allows the bearings to conduct via the conductive elastic members and the plate springs 17c. It follows that the rollers conduct to the guide plate 16 and stay 17. Thus it is easy to connect each of the rollers to ground.

With the platen roller 19, cutter 20, ejection roller 21 and idler gear 22 built into the receiving block 18, the block is screwed or otherwise attached to the base chassis 10. In the manner described, the key parts of the device are readily assembled.

In operation, as shown in FIG. 1, original documents to be transmitted are set on a document table on top of the device so that the lower edge of the lowermost document is located between the introducing roller 11 and a sheet-separating member pressed thereagainst. Working in conjunction with the sheet-separating member, the introducing roller 11 supplies one document at a time from the document table into the device. The feed roller 12 and pinch roller 23 forward the document. As the document passes between the image sensor unit 24 and the reading roller 13, the unit 24 reads the document. The image data thus read is transmitted by a transmitting means, not shown. Thereafter, the document is ejected to the front of the device by the ejection roller 14 and ejection pinch roller 25.

Upon receipt of data, the platen roller 29 pulls out the tip of the recording paper roll 26. The received data is printed on the recording paper with the thermal head 27. The recorded paper is ejected out of the device by the ejection roller 21 and pinch roller 28, and a cutter 20 cuts the ending margin of the recorded portion of the paper. The cut and ejected sheets are stacked at the top of the device.

While a preferred embodiment of the invention has been described using specific terms, such description is for illustrative purposes only, and it is to be understood that changes and variations may be made without departing from the spirit or scope of the following claims.

What is claimed is:

1. An image communication device comprising:
   a lower chassis;
   a document transport means mounted on said lower chassis and defining a document transport path extending from an upper portion of one end of said device to a lower portion of the other end of the device, whereby a space is left above said lower portion and below a level corresponding to the top of said device;
   a document reading means mounted under a middle portion of said document transport path for reading images on a downwardly facing document being transported therealong;
   an upper chassis mounted on the upper part of said lower chassis;
   a recording paper transport means mounted in said upper chassis and defining a recording paper transport path extending from the other end of said device toward said one end of said device generally parallel to said document transport path and above said document transport path and ending short of said one end of said device;
   a recording means mounted above said recording paper transport path for recording data on an upwardly facing surface of recording paper being transported along said recording paper transport path;
   a recording paper cutting means on said upper chassis at an end of said recording paper transport path toward said one end of said device; and
   a recording paper holder at the other end of said device in said space above the document transport path for holding a roll of recording paper and for feeding recording paper from said roll into said recording paper transport means.

2. A device as claimed in claim 1 in which said lower chassis has a pair of upright side plates and a bottom plate connecting said side plates, said side plates having a plurality of recesses open at their tops, and said document transport means having a plurlity of rollers for transporting documents and bearings on said rollers, said recesses receiving said bearings therein for rotatably supporting said rollers.

3. A device as claimed in claim 2 further comprising a guide plate fixedly mounted on said lower chassis for guiding documents into said document transport means, said guide plate having a plurality of projections thereon pressing at least some of said bearings against the bottoms of the recesses in which said bearings are received.

4. A device as claimed in claim 3 in which said bearings and said guide plate are electrically conductive, and further comprising means electrically connecting said guide plate to ground so that said rollers are grounded through said guide plate.

5. A device as claimed in claim 4 in which said projections have a plurality of conductive elastic members thereon contacting said bearings.

6. A device as claimed in any one of claims 2–5 further comprising a latch shaft having both ends supported by said lower chassis and having a latch mechanism thereon, said side plates of said lower chassis have further recesses therein open at the top and each with a side wall having a curved portion at the bottom thereof, said latch shaft being positioned in said curved portions, and said bottom plate having projections thereon engaging said latch shaft and urging said latch shaft into said curved portions.

7. An image communication device comprising;
 a plurality of rollers positioned along a document transport path for transporting a document therealong;
 a plurality of bearings on corresponding rollers;
 a chassis having side plates with an upper edge and recesses in said upper edge in which said bearings are received for supporting said rollers on said chassis; and
 a metal guide plate secured on said chassis for guiding documents into said plurality of rollers, said guide plate having projections thereon on the same side as said transport path as said rollers and extending transversely to the direction of said transport path, said bearings, said guide plate and said projections being electrically conductive, said projections each having an electrically conductive plastic member thereon electrically conductively engaged with and holding said rollers in said recesses, and means for electrically connecting said guide plate to ground for grounding said rollers.

8. A device as claimed in any one of claim 7 further comprising a latch shaft having both ends supported by said chassis and having a latch mechanism thereon, said side plates of said chassis have further recesses therein open at the top and each with a side wall having a curved portion at the bottom thereof, said latch shaft being positioned in said curved portions, and said bottom plate having projections thereon engaging said latch shaft and urging said latch shaft into said curved portions.

9. An image communication device comprising:
 a chassis having a pair of upright side plates and a bottom plate connecting said side plates;
 a plurality of shafts supported by said side plates;
 said side plates of said chassis having recesses therein open at the top and each with a side wall having a a curved portion at the bottom thereof, said shafts being positioned in said curved portions, and said bottom plate having projections thereon engaging said shafts and urging said shafts into said curved portions.

* * * * *